(12) United States Patent
Shaffer et al.

(10) Patent No.: US 7,792,277 B2
(45) Date of Patent: Sep. 7, 2010

(54) CALL CENTERS WITH IMAGE OR VIDEO BASED PRIORITY

(75) Inventors: Shmuel Shaffer, Palo Alto, CA (US); Labhesh Patel, San Francisco, CA (US); Mukul Jain, San Jose, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1092 days.

(21) Appl. No.: 11/485,053

(22) Filed: Jul. 11, 2006

(65) Prior Publication Data

US 2008/0037762 A1 Feb. 14, 2008

(51) Int. Cl.
*H04M 3/00* (2006.01)

(52) U.S. Cl. .............................. 379/266.02; 379/266.01; 455/556.1

(58) Field of Classification Search ............ 379/265.09, 379/266.01, 266.02; 455/556.1
See application file for complete search history.

(56) References Cited

U.S. PATENT DOCUMENTS

| | | | |
|---|---|---|---|
| 6,665,396 B1 | 12/2003 | Khouri et al. | |
| 6,754,335 B1 | 6/2004 | Shaffer et al. | |
| 7,058,164 B1 | 6/2006 | Chan et al. | |
| 7,058,710 B2 | 6/2006 | McCall et al. | |
| 7,085,367 B1 * | 8/2006 | Lang | 379/265.06 |
| 7,149,499 B1 | 12/2006 | Oran et al. | |
| 7,180,993 B2 | 2/2007 | Hamilton | |
| 7,209,475 B1 | 4/2007 | Shaffer | |
| 2005/0215229 A1 | 9/2005 | Cheng et al. | |

OTHER PUBLICATIONS

Surveillance Camera Players, "I can see the future," 10 predictions concerning cell-phones, http://www.notbored.org/cell-phones.html, Jun. 21, 2003.

* cited by examiner

*Primary Examiner*—Creighton Smith
(74) *Attorney, Agent, or Firm*—Weaver Austin Villeneuve & Sampson LLP

(57) ABSTRACT

Disclosed are apparatus and methods for utilizing the camera or video capability of particular communication devices, such as cell phones, to enhance handling of calls, such as emergency calls. In one implementation, when a call is made to an emergency response center (ERC) using an image/video capable communication device is queued until an agent is available for handling the call, one or more images or video may be collected from such caller by utilizing the image/video capability of the caller's communication device. The images collected from a plurality of different callers may then be sorted into different event groups. For instance, all the images/video that relate to a same emergency event, such as a traffic accident, are grouped together into a same event group. The different groups can then be prioritized for handling by an available agent. Additionally, the individual callers for each group may also be prioritized based on the collected images/video, e.g., the caller that is closest to the emergency event may be called first.

27 Claims, 6 Drawing Sheets

US 7,792,277 B2

CALL CENTERS WITH IMAGE OR VIDEO BASED PRIORITY

BACKGROUND OF THE INVENTION

The present invention relates to the general technology area of emergency response centers for handling incoming calls related to emergency events. More specifically, it relates to handling calls that have been queued.

Emergency Response Centers (ERC) (e.g. 911) typically employ Automated Call Distribution (ACD) centers to answer, queue, and dispatch calls to call handlers in the order in which they are received. With the recent proliferation of cell phones, the volume of calls to emergency services has increased dramatically and has challenged the existing infrastructure. On the positive side, when an emergency occurs, there are usually numerous people with cell phones who can alert emergency response personnel and call for help. On the negative side, when multiple people call to report the same emergency (e.g. a fire or a motor vehicle accident at a given location), the system can become flooded with callers tying up the center's phone lines.

What is needed is a technique for intelligently managing emergency queued calls so as to enhance the efficiency of responding to such calls.

SUMMARY OF THE INVENTION

The present invention provides apparatus and methods for utilizing the camera or video capability of particular communication devices, such as cell phones, to enhance handling of calls, such as emergency calls. In one implementation, when a call is made to an emergency response center (ERC) using an image/video capable communication device is queued until an agent is available for handling the call, one or more images or video may be collected from such caller by utilizing the image/video capability of the caller's communication device. The images collected from a plurality of different callers may then be sorted into different event groups. For instance, all the images/video that relate to a same emergency event, such as a traffic accident, are grouped together into a same event group. The different groups can then be prioritized for handling by an available agent. Additionally, the individual callers for each group may also be prioritized based on the collected images/video, e.g., the caller that is closest to the emergency event may be called first.

In one embodiment, a method for managing calls, such as emergency calls, is disclosed. A plurality of calls related to a plurality of events are received. At least a portion of the calls are queued to await handling by an agent. One or more images or videos are collected from one or more of the queued calls. The queued calls for handling by an agent are prioritized based on the collected images and/or videos. A call is selected for handling by an agent based on the image/video based priority.

In a specific implementation, at least a portion of the prioritization operation is performed by a human. In another aspect, at least a portion of the prioritization operation is performed automatically by an image analytics software program. In one embodiment, the one or images or videos are only collected from communication devices that are image or video capable. In one aspect, a communication device that is image or video capable includes a cellular telephone. In another aspect, the communication device that is image or video capable is selected from a group consisting of a cellular telephone, a personal digital assistant (PDA) and cell phone device, a computer, a hand-held computer, and a laptop.

In a specific implementation, collecting one or more images is accomplished by automatically prompting the caller of each queued call, which utilizes a communication device having image or video capability, to provide an image or video related to the event. In a further aspect, each caller of each queued call, which utilizes a communication device having image or video capability, is automatically prompted to continually provide a plurality of videos or images while waiting. In another embodiment, collecting one or more images is further accomplished by prompting a particular caller for a different image or video after receiving an image or video from the caller and when a different image or video is required. In a further embodiment, prompting the particular caller for a different image or video includes prompting the particular caller for a closer view of a portion of the event or a close up of the entire event. In yet another embodiment, prompting the particular caller for a different image or video includes prompting the particular caller for a different view of the event. In another aspect, prompting the particular caller for a different image or video is performed or initiated by a human. In one aspect, prompting the particular caller for a different image or video is at partially performed automatically. In a specific implementation, prompting the particular caller for a different image or video is accomplished by an expert selecting, on a display, a particular image corresponding to the particular caller and then selecting a prompting input mechanism that then causes the particular caller to be automatically prompted for a different image or video. In a further aspect, prompting the particular caller for a different image or video is further accomplished by the expert specifying the different image or video.

In yet another aspect, prompting the particular caller for a different image or video is accomplished by an expert typing in a prompt message that is thereby automatically read to the particular caller. In another embodiment, prompting the particular caller for a different image or video is accomplished by an expert directly prompting the particular caller.

In a specific implementation, prioritizing the queued calls is accomplished by (i) sorting the collected images or videos into event groups so that the collected images or videos of a particular event group show a same event, (ii) prioritize the event groups for handling by an agent based on analysis of the collected images and videos, and (iii) prioritize the images and videos of each event group for handling by an agent based on analysis of the collected images and videos. A call is selected for handling by selecting the highest priority image or video of the highest priority event group. In a further aspect, the collected images or videos are sorted by, on a display, repeatedly dragging one or more selected images to a particular event group folders until all of the images and videos are sorted into specific event group folders.

In one feature, the collected images or videos are sorted by are automatically sorted by image analysis software and/or hardware. In another aspect, the collected images or videos are sorted based on GPS information provided with each image or video. In yet another embodiment, sorting the collected images or videos includes using two or more images of a particular event group to form a panoramic image of a scene.

In a specific embodiment, a call is selected by selecting a particular image or video to thereby automatically connect an agent to a caller associated with the selected particular image or video. In a further aspect, an agent that is handling a selected call is also presented with all the images or videos that correspond to the same event related to the handled call, and the method further includes, upon selection of another image or video by the agent, automatically connecting the agent to the caller associated with the other selected image or video. In another aspect, one or more images that are associated with a particular event are sent to a responder that is physically responding to the event.

In an alternative embodiment the invention pertains to a computer system for managing calls. The system includes one or more processors and one or more memory. The one or more processors and memory are configured to perform one or more of the steps described above.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention provide response mechanisms for receiving images/video regarding an event, such as an emergency event, and using such images/video to enhance handling of such events. In the illustrated examples, camera/video cell phones are utilized. However, the present invention is not limited to cell phones. That is, any suitable image and/or video capable communication device may be utilized, such as a PDA (personal digital assistant) having cell and image capabilities. It is also contemplated that other types of telephones (e.g., IP telephones) may have image/video capability that may be utilized by embodiments of the present invention. Although example implementations are described in relation to managing calls related to emergency events, of course, the invention can be applied to other type of calls that are related to other types of event.

Figure 1:
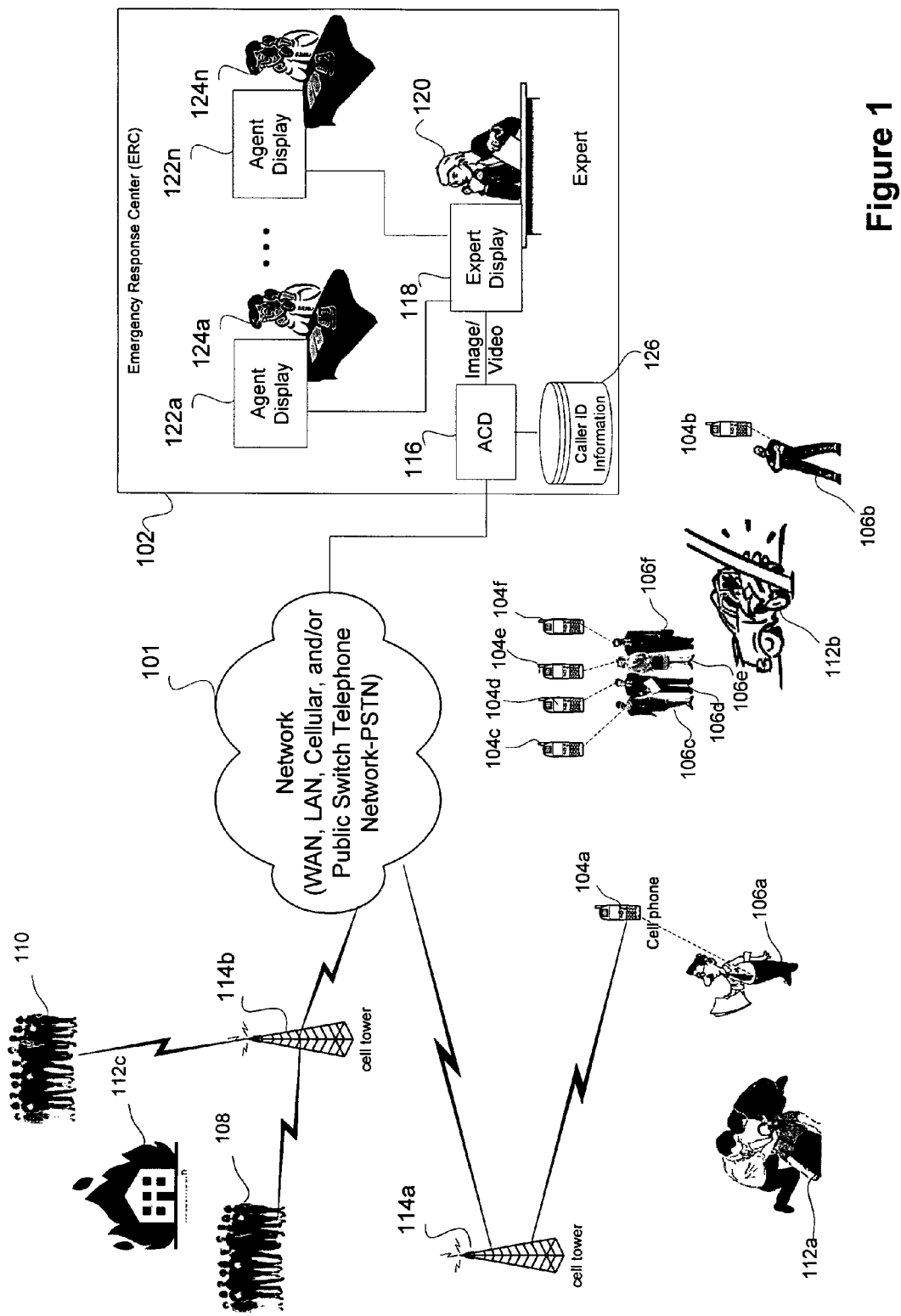
FIG. 1 is diagrammatic representation of an emergency response center (ERC) arrangement for handling emergency calls in accordance with one embodiment of the present invention.

FIG. 1 is diagrammatic representation of an emergency response center (ERC) arrangement for handling emergency calls in accordance with one embodiment of the present invention. As shown, an ERC 102 receives emergency calls from several cell phones 104 via network 101. Network 101 may represent any combination of network types: a wide area network (WAN) such as the Internet, one or more local area networks (LAN's), one or more cellular phone networks, one or more public switch telephone networks (PSTN's). Each cellular phone would typically communicate through a proximate cell tower 114 and cellular network, which may be coupled to a WAN or PSTN.

The emergency calls received by ERC 102 pertain to a plurality of emergency events 112. For example, calls from cell phones 104b-104f pertains to a car accident 112b, while calls from cell phone 104a pertains to a heart attack victim 112a. Likewise, cell calls are placed by multiple individuals in crowd 108 and 110, and these calls all pertain to a house fire 112c.

These emergency calls may be received into an automated call distributor (ACD) 116 of ERC 102. The ACD is generally configured to automatically handle calls that require queuing. For instance, the ACD typically plays a recorded message to the caller indicating the queue time. In embodiments of the present invention, the ACD 116 may also collect images/video from particular queued callers. The ACD 116 may utilize one or more Caller ID Information database(s) 126 to assess whether particular calls emanate from a video/image capable communication device. These databases 126 may be local to the ERC 102 (as shown) and/or accessible via network 101 from various telephone service providers or the like.

The images/video may be displayed on an Expert Display 118 and analyzed by an Expert 120 who prioritizes the calls based on such analysis. The expert may be a human who manually views and analyzes the collected images/video and then sorts and/or prioritize such images/video and their associated callers. Alternatively, the expert may be in the form of image analytics software that is designed to sort and/or prioritize images (and callers) based on predetermined factors as described further below. Of course, a combination of manual and automated image analysis techniques may be utilized.

After the collected images are analyzed and prioritized, the calls may be handled based on such prioritization by an available agent 124. The agent may view the image(s)/video associated with a particular call on an agent display 122. In one implementation, the expert 120 determines which calls are to be forwarded to each agent and the order of such call distribution is based on analysis of images/video collected for such calls.

Figure 2:
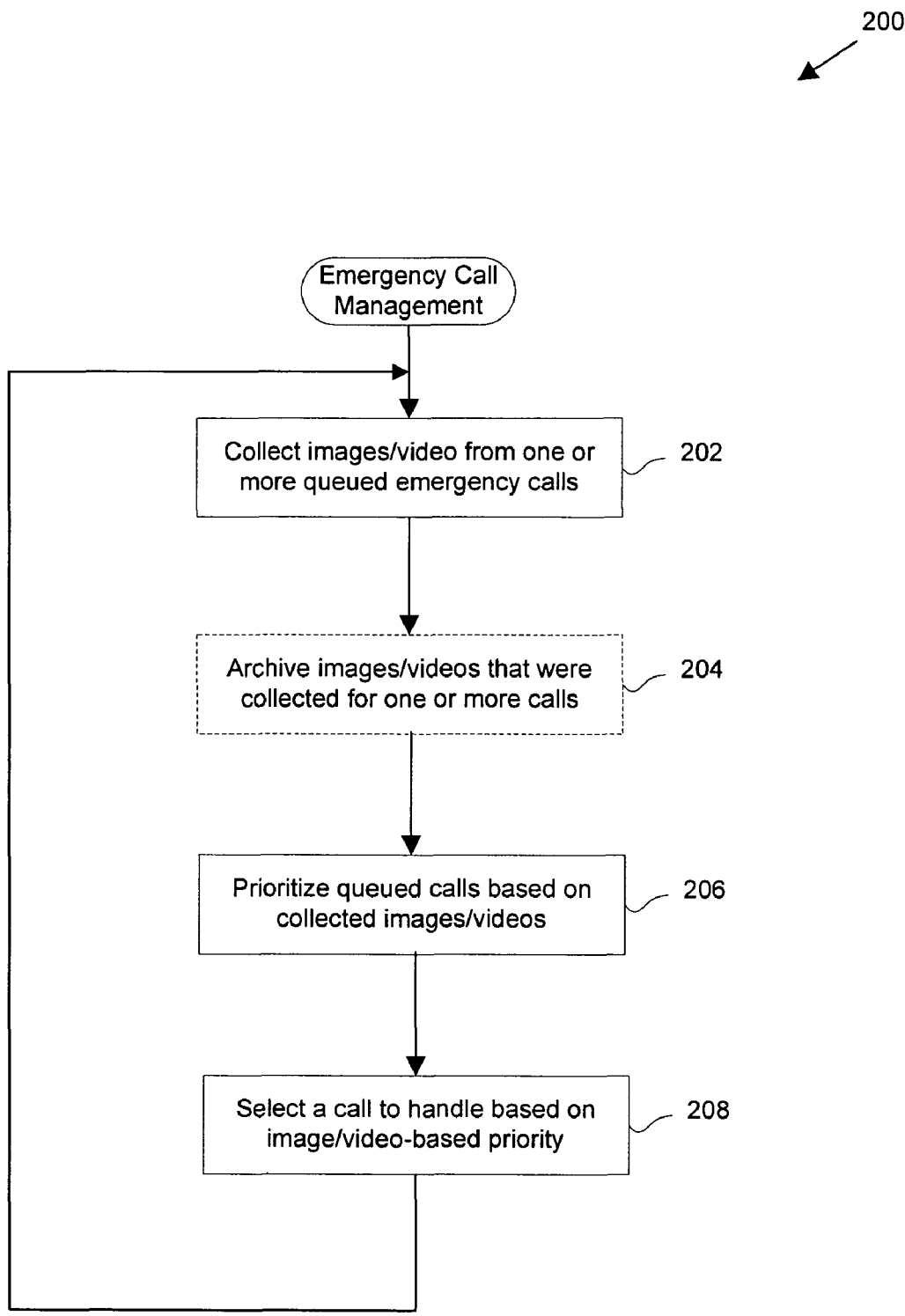
FIG. 2 is a flowchart illustrating an emergency response management procedure in accordance with one implementation of the present invention.

FIG. 2 is a flowchart illustrating an emergency response management procedure 200 in accordance with one implementation of the present invention. Initially, one or more video or image(s) are collected from one or more queued emergency calls in operation 202. In general, images and/or video are collected from callers that are utilizing an image/video capable communication device, such as a cell phone. The one or more image(s)/video that are collected may be archived in operation 204. For instance, archived images and video may later be used as evidence during investigation or litigation of a particular emergency event.

The queued calls may then be prioritized based on the collected images or videos in operation 206. A call is then handled based on this image/video-based priority in operation 208 and the call management procedure 200 may then repeated. For instance, all calls that have an image of a same event may be grouped together. The different events may be prioritized based on the images or videos collected for the different events. By way of example, a life-threatening injury may be prioritized over a car accident with no injuries. The calls within a particular group may also be prioritized based on their associated images or video. For instance, after analyzing the respective views of the images collected for a particular emergency event, the caller that has the best view of a particular event may be prioritized over callers with inferior views.

Figure 3:
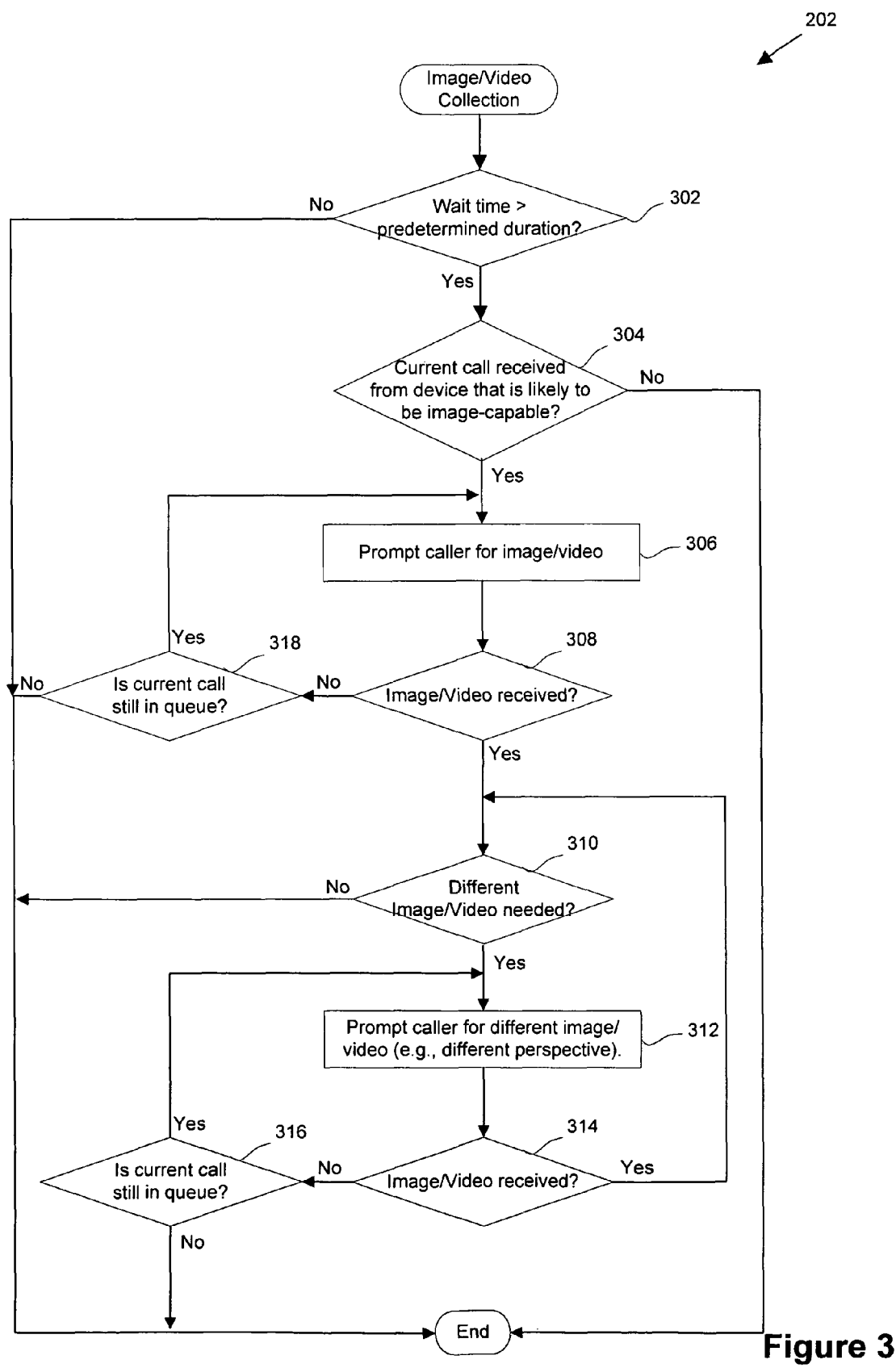
FIG. 3 is a flowchart illustrating the image/video collection operation of FIG. 2 in accordance with one embodiment of the present invention.

FIG. 3 is a flowchart illustrating the image/video collection operation 202 of FIG. 2 in accordance with one embodiment of the present invention. The collection operation 202 is shown as being implemented on the currently received call so as to simplify discussion of the present invention. This collection operation 202 may be repeated for each subsequently received call. For example, this collection operation 202 may be triggered by receipt of an emergency call. Of course, a predetermined number of calls may first be received before implementing such image or video collection procedure on all the received calls. Also, when the queue for waiting calls is greater than a particular duration, this collection procedure may be triggered and practiced on all the calls in such queue and then continue for subsequently received calls.

Referring to FIG. 3, it may first be determined whether the wait timed for queued calls is greater than a predetermined duration in operation 302. The queue includes calls that are awaiting handling by an agent. For instance, when all available agents are busy handling calls and another call is received by the ERC, the new call is queued. An automated message may be played for the queued caller indicating that his/her call is being queued, the estimated duration of the wait, an apology for the wait, etc. The predetermined wait duration, after which image collection is triggered, may be any suitable value and may depend on the following factors: average time to collect an image or video from a queued call, average time for analysis of such images, average time for handling each call, etc. In one example, the predetermined wait time, after which image collection is triggered, is 30 seconds. Alternatively, the image/video collection procedure may simply be triggered for all queued calls regardless of the queue wait duration.

If the current wait time is not more than the predetermined duration (as determined in step 302), the collection operation 202 is not performed for the currently received call in this example implementation. If the wait time is determined in step 302 to be more than the predetermined duration, it may then be determined whether the current call is received from a device that is likely to be image/video capable in operation 304. For instance, the caller ID of the current call is looked up in a Caller ID Information database (e.g., 126) to determine the type of device associated with such caller ID. For instance, if a cell phone is associated with the caller ID of the current call, then is may be determined that the caller device likely has image/video capability. The database may also list the particular cell phone model and particular capabilities so that it may be determined more precisely whether the current call has video/image capability.

If the current call is not likely to be image/video capable, the image collection procedure 202 ends for the currently received call. If the current call is deemed to have image/video capability, the caller is then automatically prompted to provide an image/video in operation 306. A caller that is in queue may also be automatically prompted to provide as many images/video as possible while waiting in line. It may then be determined whether an image/video has been received in operation 308. If an image/video has not been received, the caller may continue to be prompted as long as the current call is still queued (operation 318). When an image/video is received, it may then be determined whether a different image or video is needed in operation 310. For example, an expert may view the received image to determine whether a different perspective (e.g., different angle or closer view) of the emergency event would be helpful. If no further image/video is need, the procedure 202 ends.

If a different image/video is needed, the caller may be prompted for a different image/video in operation 312. For example, a human expert may ask for a specific angle or closer view of the emergence event. Alternatively, a human or software expert may cause a pre-recorded message to be played to the caller so as to request a specific perspective. The procedure 202 then determines whether a different image/video has been received in operation 314. If a different image/video has not been received, it may then be determined whether the current call is still in queue in operation 316. If the current call is no longer in queue, the image collection procedure 202 ends. Otherwise, the caller continues to be prompted for the different image/video until it is received in operation 312. After a different image/video is received, it may again be determined whether another image/video is needed in operation 310. When different images are no longer required, the collection procedure ends. Of course, images/videos may be continuously collected from a queued caller.

Figure 4:
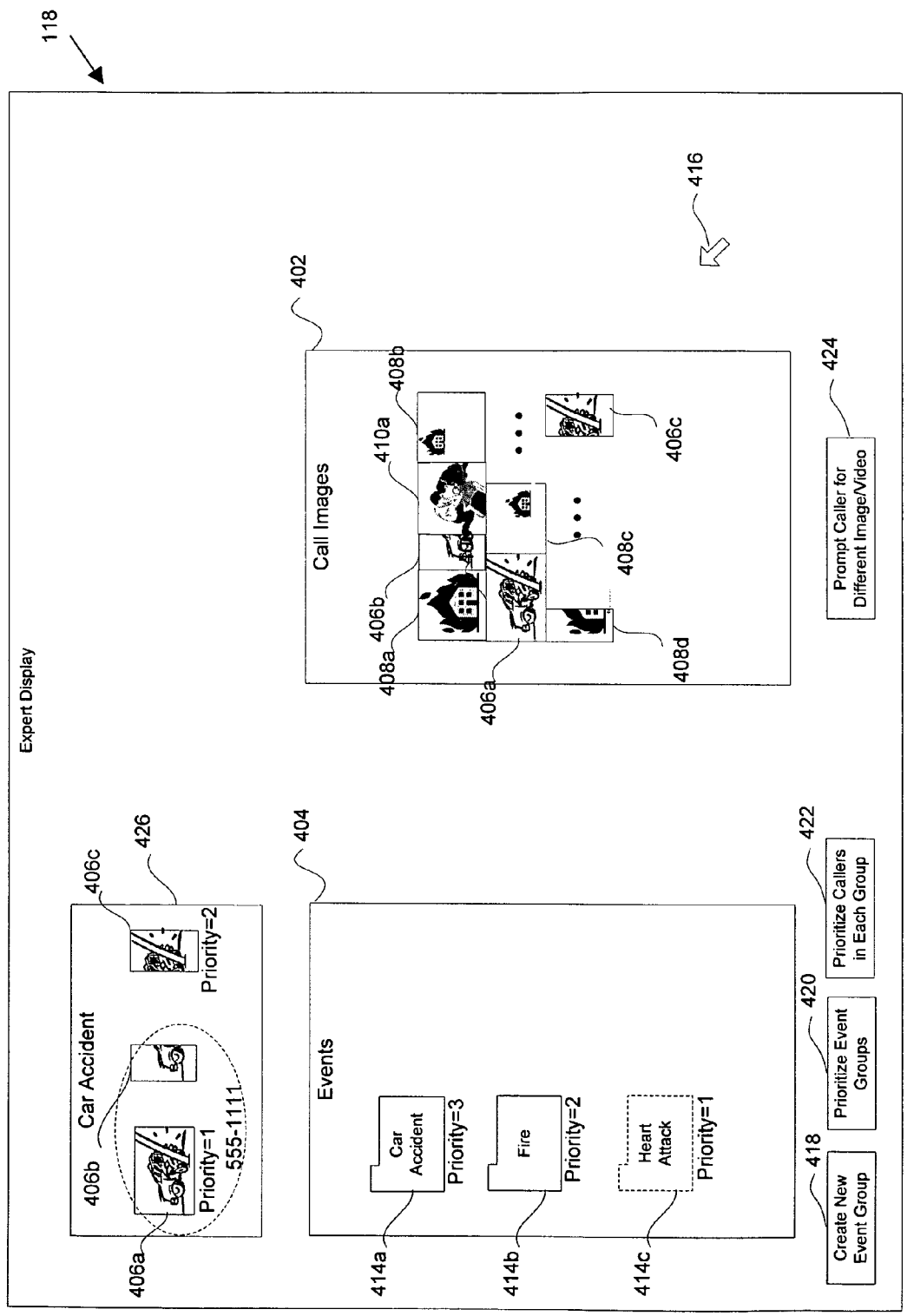
FIG. 4 is a diagrammatic representation of the expert display of FIG. 1 in accordance with a specific embodiment of the present invention.

FIG. 4 is a diagrammatic representation of the expert display 118 of FIG. 1 in accordance with one embodiment of the present invention. This expert display 118 is illustrated for use by a human expert to group and prioritize calls based on collected images/video. However, similar techniques may be used by an automated image analysis expert with or without use of a display. As shown, the expert display 118 includes a plurality of received call images 402. The call images 402 includes call images 408a, 408b, 408c, and 408d that relate to a fire event; call images 406a, 406b, and 406c that pertains to a car accident event; and call image 410a that relates to a heart attack event.

The expert display 118 may also include an input mechanism 424 for prompting a caller for a different image or video. For instance, an expert may select a particular caller by selecting an image and then selecting the "Prompt Caller for Different Image/Video" in put mechanism 424. This sequence may result in the user being automatically prompted to upload an image having a magnification of the event or injury, a different perspective of the event, or a different portion of the event. In a specific implementation, the expert may be presented with a list of specific prompting options, such as "Upload an image that shows a close up of the emergency event", "Upload an image that shows a close up of the injury area", "Upload an image that shows a rear perspective of event", "right side of event", "left side of event", "upper portion of event", "bottom portion of event", etc. After the expert selects a prompting option, the selected option is then automatically presented to the caller, e.g., in the form of a recorded message. In other implementations, the expert may type in a specific prompting message that is then automatically read to the caller or the expert may prompt the caller directly by talking with the caller to obtain a different image/video. In yet another embodiment, a selected caller may be automatically connected to a human expert so that the human expert may request a different image or video directly from the caller, e.g., after a particular image is selected by the expert. In the example of FIG. 4, for the car accident event an expert may request a close up image of the interior of the car to assess whether anyone is injured in the car or request a close up of all injured accident victims (whether inside or outside the car).

Figure 5:
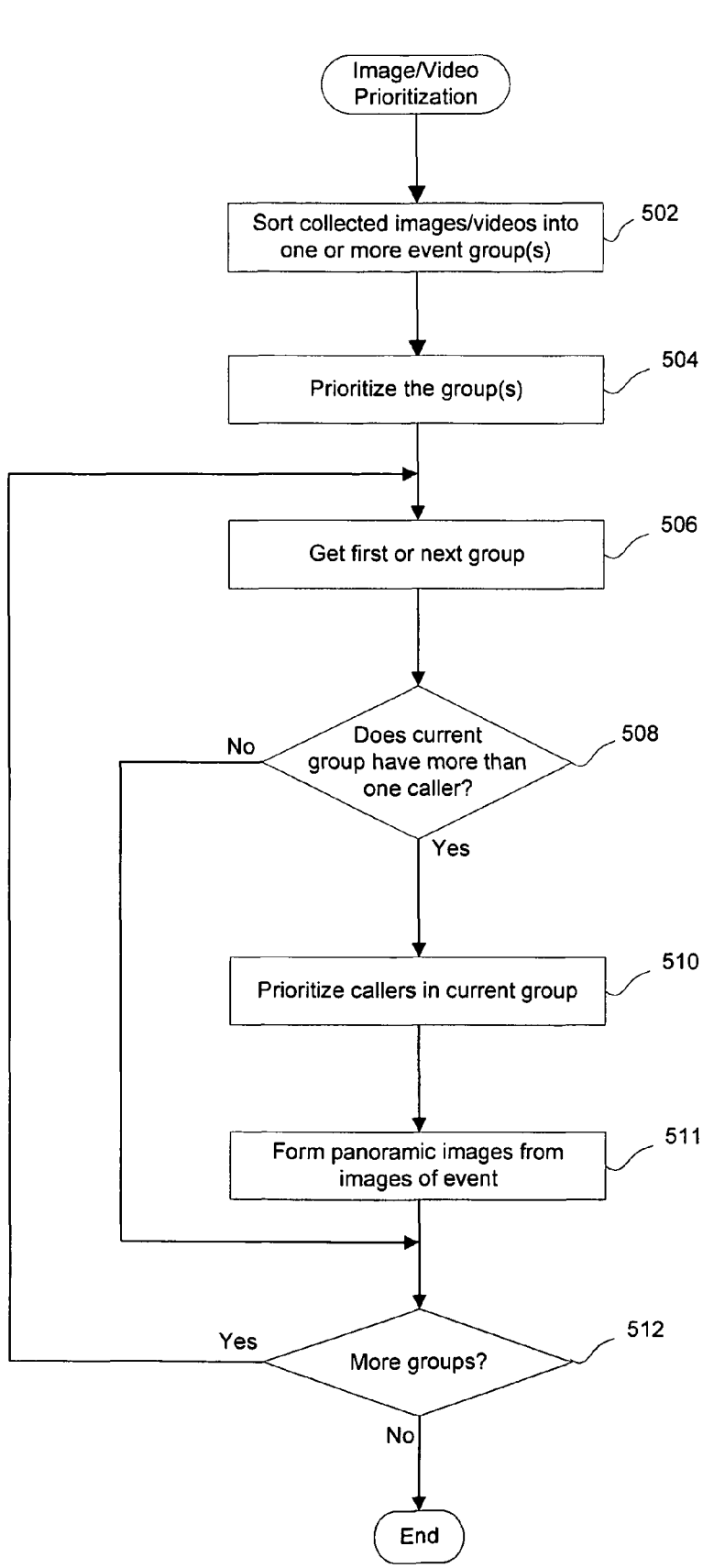
FIG. 5 is a flowchart illustrating the image/video prioritization operation of FIG. 2 in accordance with one embodiment of the present invention.

Once a number of images/video have been collected for a set of queued calls, the calls may be prioritized based on the collected images/video. FIG. 5 is a flowchart illustrating the image/video prioritization operation 206 of FIG. 2 in accordance with one embodiment of the present invention. This prioritization operation 206 will be described in conjunction with the expert display 118 of FIG. 4.

Initially, the expert may sort the collected images/videos into one or more event group(s) in operation 502. The expert may sort images into an existing event group or create a new event group. As shown in FIG. 4, events area 404 contains a car accident group 414a and a fire group 414b in the form of folders. Images that show the same fire may be dragged and placed in the fire group folder 414b, while the images that show the same car accident may be dragged and dropped in the car accident folder 414a. Of course, any suitable binning input mechanism may be utilized. For instance, the images may be dragged into other icons that represent event groups or pull-down menus or input boxes may be used to select a particular event group for each image/video. In the illustrated implementation, a new group may be formed by selecting an input mechanism 418 to "Create New Event Group." Selection of this Create New Group mechanism 418 may result in the expert being prompted for a group name, after which a folder with the specified name is created. For example, the expert may enter a name for "Heart Attack" and a heart attack event folder 414c is then added to the events area 404.

This image sorting process may be performed by automated image analysis software and/or hardware. In accordance with one embodiment, an image analysis system analyzes the images and automatically groups them into images that contain smoke or fire, images of people, images of motor vehicle accidents, etc. The system may also use 2-D image analysis in an attempt to correlate the images and determine if any of the pictures are from the same scene. If a match is detected, the system may also use software similar to Photo Shop to build the individual images into a panoramic image of the scene. In yet another embodiment, the system utilizes GPS (global positioning system) information from the various cell phones to group them via location as well as by the images provided. GPS information may be requested from the communication device or automatically provided with each image/video. This GPS technique will greatly reduce the amount of computation required to correlate images. For example the system will not attempt to correlate fire images from callers who are calling from different parts of town. The system may still correlate images of, e.g., a hurricane or any other large event, even though they may have arrived from different parts of town.

An automated image sorting process may be utilized in conjunction with human experts. For instance, the images may be pre-sorted in to groups based on GPS information or other automated correlation techniques prior to being presented to an expert for further sorting and/or analysis of such images. The human expert may also override the sorting and/or priority assignments of the automated process.

After the images are grouped, the expert (automated or human) may also prioritize the existing group(s) in operation 504. This group prioritization may be accomplished in any suitable manner. In the example of FIG. 4, a "Prioritize Event Groups" input mechanism 420 is selected. When the "Prioritize Event Groups" mechanism 420 is selected, the expert may be presented with a list of the events that can be dragged into a particular priority order. Alternatively, the expert may be presented with a list of events that each has an associated input box for entering a priority number. In one example, the heart attack event 414c has the highest priority since the event is life threatening; the fire has the second priority; and the car accident is given the lowest priority. Prioritization of events may be based on any suitable factors, such as whether a person is injured (e.g., heart attack victim) or whether the risk of injury is high (e.g., robbery in progress), the severity of the existing injury or potential injury, the number of people injured, the size of the event, the potential for the event spreading to larger area (e.g., fire), etc.

The images or callers in each group may then be prioritized. That is, each caller may be prioritized based on which caller has a best image or the images/video may be prioritized regardless of whether more than one image/video belongs to a same caller. For instance, the prioritization procedure 206 includes getting a first group in operation 506. It is then determined whether this current group has more than one caller in operation 508. If there is more than one caller, the callers are then prioritized for the current group in operations 510.

If there is only one caller for a particular event, it is then determined whether there are any more groups in operation 512. If there are no more groups, the prioritization operation 206 ends. If there are more groups, the procedure gets the next group in operation 506 and prioritization continues for the remaining groups.

The callers (or images) of each event may be prioritized using any suitable interface. As shown, an input mechanism 422 for "Prioritizing Callers in Each Group" is provided. When this mechanism 422 is selected, the expert may be presented with the images in each group. For example, event area 426 contains the images for the car accident event. The images may also be grouped by caller. As shown, images 406a and 406b belong to a same caller having phone number 555-1111, while image 406c belongs to a different caller having a different phone number (not shown). The expert may double click on an image or caller group and then input a priority level. As shown, image 406a and corresponding caller 555-1111 is given the highest priority, while the image 406c and its associated caller (not shown) is given a second highest priority. Of course, the expert may choose only to prioritize a subset of the callers/images from a particular group. For example, the expert may choose only the three highest priority callers.

Once groups and callers are prioritized, a call may be selected for handling based on such prioritization. In one implementation, the expert may send the highest priority event images to the next available agent. The agent then views the images of such group to select the highest priority image by double-clicking on such image. When a particular image is selected, the agent may automatically be connected to the associated caller. Alternatively, the expert may simply select the highest priority caller from the highest priority event and connect the agent to such caller without the agent having to analyze the images of a group. Preferably, the agent receives all the images, as well as any generated panoramic views, collected for the particular event so the agent may view the images to gain more information regarding the event while handling the highest priority caller. The agent may choose to select another caller based on the viewed images or conference a plurality of callers having differing perspectives related to the event.

Embodiments of the present invention provide enhanced an emergency response system for efficiently handling emergency calls. First, the system identifies callers who potentially can render images from the scene and encourages them to use their wait time in queue to collect visual information about the event they are about to report on and upload the images to the ERC. Second, aspects of the system provides Call Center agents with the ability to select and answer a specific call by double clicking on an image which was rendered from a specific viewpoint. The rendered images (streamed from the various events) can provide more detailed information to the agent. To convey the same information verbally would take much longer and could clog emergency lines for a longer period of time. Aspects of the system keep an association between the various images and the caller ID of calls in the Call Center queue so as to readily connect with a caller associated with a particular image.

Embodiments of the system also allow an expert to sift through the incoming images, and categorize and tag them accordingly. The system allows the expert to assign priorities to calls based on the content of the images from the various scenes. Additionally, if the first caller is not able to provide all of the desired information, the agent may manually select another caller from the same scene. Embodiments of the system are configured to automatically scan the incoming images and categorize them based on the scene (fire, accident, people, etc.). Specific implementations of the system also attempt to correlate the various images and create a panoramic view of the event. This operation may be assisted by employing location information or a human expert.

The images of an event may also be sent to the policemen, firemen, or emergency workers who are actually being directed to the emergency events. These responders may use the images to assess the scene prior to arrival at the scene, e.g., to gather necessary equipment, etc. The responders may also gain a more thorough understanding of the evolution of the event over time.

Although a caller is described as utilizing a cell phone, a caller may also have access to other types of communication devices that are image capable. For instance, the caller may utilize any of the following devices having image/video capability: a combination cell phone and PDA (personal digital assistant), a computer, a hand-held computer, or laptop. In another implementation, a wireless device may utilize any suitable wireless communication mechanism and/or application. Examples include a Bluetooth or IR (infrared) protocol, Jini Network Technology (available from Sun Microsystems, Inc., of Santa Clara, Calif.), Zeroconf (zero configuration networking), an 802.11 wireless protocol, etc.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 6:
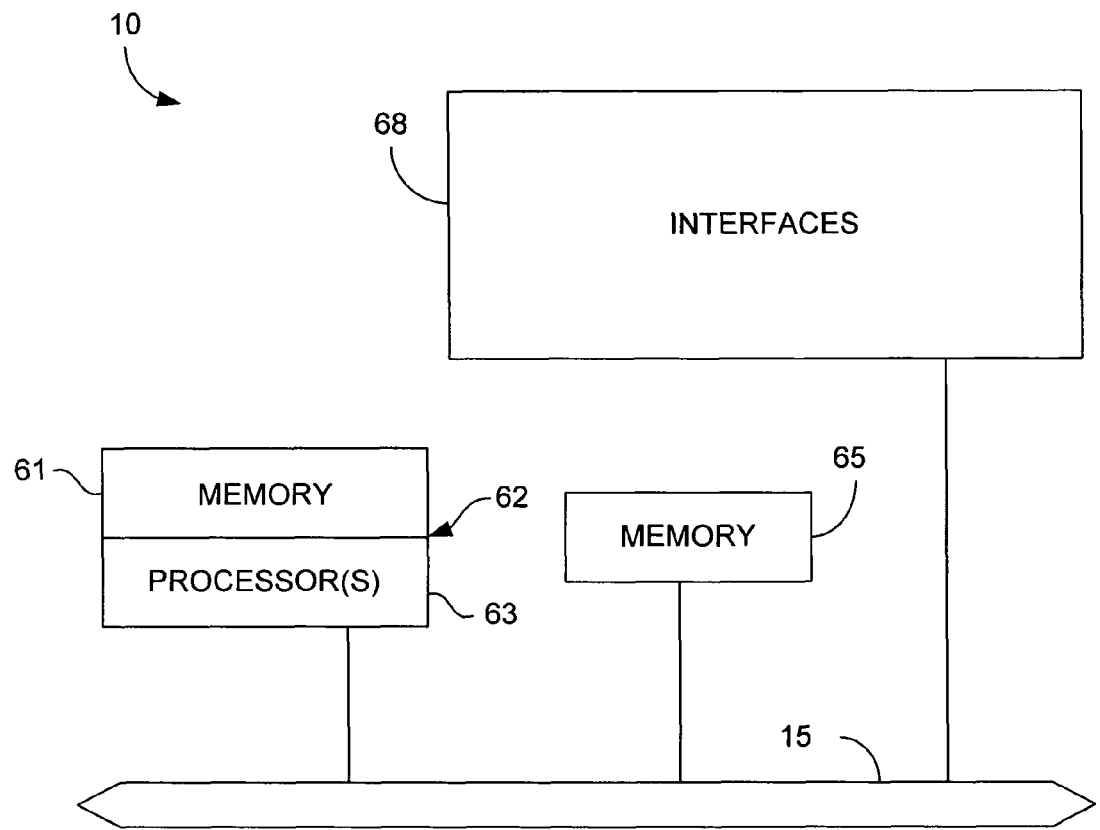
FIG. 6 is a diagrammatic representation of a computer system in which some of the techniques of the present invention may be implemented.

Referring now to FIG. 6, a computer system 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such computer system tasks as computations and application management. It preferably accomplishes all these functions under the control of software including an operating system and any appropriate applications software. CPU 62 may include one or more processors 63 such as a processor from the Motorola family of microprocessors, Intel family of microprocessor, or the MIPS family of microprocessors. In an alternative embodiment, processor 63 is specially designed hardware for controlling the operations of computer system 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the computer system 10. Among the interfaces that may be provided are Ethernet interfaces, frame relay interfaces, cable interfaces, DSL interfaces, token ring interfaces, Bluetooth, wireless, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media.

Although the system shown in FIG. 6 is one specific computer system of the present invention, it is by no means the only computer system architecture on which the present invention can be implemented. Regardless of a computer system's configuration, it may employ one or more memories or memory modules (such as, for example, memory block 65) configured to store data, program instructions for the general-purpose processing operations and/or the inventive techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The computer readable media may take the form of a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for managing calls, comprising:
   receiving a plurality of calls related to a plurality of events, wherein at least a portion of the calls are queued to await handling by an agent;
   collecting a plurality of images or videos from one or more of the queued calls;
   prioritizing the queued calls for handling by an agent based on a plurality of different event types determined from the collected images and/or videos; and
   selecting a call for handling by an agent based on the image/video based priority.

2. A method as recited in claim 1, wherein at least a portion of the prioritization operation is performed by a human and/or automatically by an image analytics software program.

3. A method as recited in claim 1, wherein at least a subset of the calls are emergency calls related to emergency event types that can be determined from the collected images or videos for such subset.

4. A method as recited in claim 1, wherein each of the images or videos is collected from a cellular telephone, a personal digital assistant (PDA) and cell phone device, a computer, a hand-held computer, or a laptop.

5. A method as recited in claim 1, wherein collecting one or more images is accomplished by automatically prompting one or more caller(s) of one or more queued call(s) to each provide one or more image(s) or video(s) related to the event.

6. A method as recited in claim 5, wherein collecting one or more images is further accomplished by prompting a particular caller for a different image or video after receiving and analyzing an image or video from the particular caller and determining that a different image or video is required.

7. A method as recited in claim 1, wherein prioritizing the queued calls is accomplished by:
   based on the different event types determined from the collected images or videos, sorting the collected images or videos into event types so that the collected images or videos of a particular event type show a same event;
   prioritizing the event types for handling by an agent based on analysis of the collected images and videos; and
   prioritizing the images and videos of each event type for handling by an agent based on analysis of different locations or views of the collected images and videos of the event type,
   wherein a call is selected for handling by selecting the highest priority image or video of the highest priority event type.

8. A method as recited in claim 7, wherein the collected images or videos are automatically sorted by image analysis software and/or hardware.

9. A method as recited in claim 7, wherein the collected images or videos are sorted based on GPS information provided with each image or video.

10. A method as recited in claim 7, wherein sorting the collected images or videos includes using two or more images of a particular event type to form a panoramic image of a scene that is presented to an agent when the event is handled by the agent.

11. A method as recited in claim 1, wherein a call is prioritized and selected by selecting a particular image or video received with such call to thereby automatically connect an agent to a caller associated with the selected particular image or video.

12. A method as recited in claim 11, wherein an agent that is handling a selected call is also presented with all the images or videos that correspond to the same event related to the handled call, the method further comprising, upon selection of one or more other image(s) or video(s) by the agent, automatically connecting the agent to the one or more caller(s) associated with the other selected one or more image(s) or video(s) whereby if a plurality of images or videos is selected, a conference is set up.

13. A method as recited in claim 1, further comprising sending one or more images that are associated with a particular event to a responder that is physically responding to the event.

14. A computer system managing calls, comprising:
   one or more processors;
   one or more memory, wherein at least one of the processors and memory are configured for:
      receiving a plurality of calls related to a plurality of events, wherein at least a portion of the calls are queued to await handling by an agent;
      collecting a plurality of images or videos from one or more of the queued calls;
      prioritizing the queued calls for handling by an agent based on a plurality of different event types determined from the collected images and/or videos; and
      selecting a call for handling by an agent based on the image/video based priority.

15. A computer system as recited in claim 14, wherein at least a portion of the prioritization operation is performed by a human and/or automatically by an image analytics software program.

16. A computer system as recited in claim 14, wherein at least a subset of the calls are emergency calls related to emergency event types that can be determined from the collected images or videos for such subset.

17. A computer system as recited in claim 14, wherein each of the images or videos is collected from a cellular telephone, a personal digital assistant (PDA) and cell phone device, a computer, a hand-held computer, or a laptop.

18. A computer system as recited in claim 14, wherein collecting one or more images is accomplished by automatically prompting one or more caller(s) of one or more queued call(s) to each provide one or more image(s) or video(s) related to the event.

19. A computer system as recited in claim 18, wherein collecting one or more images is further accomplished by prompting a particular caller for a different image or video after receiving and analyzing an image or video from the particular caller and determining that a different image or video is required.

20. A computer system as recited in claim 14, wherein prioritizing the queued calls is accomplished by:
   based on the different event types determined from the collected images or videos, sorting the collected images or videos into event types so that the collected images or videos of a particular event type show a same event;
   prioritize the event types for handling by an agent based on analysis of the collected images and videos; and
   prioritize the images and videos of each event type for handling by an agent based on analysis of different locations or views of the collected images and videos of the event type, wherein a call is selected for handling by selecting the highest priority image or video of the highest priority event type.

21. A computer system as recited in claim 20, wherein the collected images or videos are automatically sorted by image analysis software and/or hardware.

22. A computer system as recited in claim 20, wherein the collected images or videos are sorted based on GPS information provided with each image or video.

23. A computer system as recited in claim 20, wherein sorting the collected images or videos includes using two or more images of a particular event type to form a panoramic image of a scene that is presented to an agent when the event is handled by the agent.

24. A computer system as recited in claim 14, wherein a call is prioritized and selected by selecting a particular image or video received with such call to thereby automatically connect an agent to a caller associated with the selected particular image or video.

25. A computer system as recited in claim 24, wherein an agent that is handling a selected call is also presented with all the images or videos that correspond to the same event related to the handled call, the method further comprising, upon selection of one or more other image(s) or video(s) by the agent, automatically connecting the agent to the one or more caller(s) associated with the other selected one or more image(s) or video(s) whereby if a plurality of images or videos is selected, a conference is set up.

26. A computer system as recited in claim 14, wherein the at least one of the processors and memory are configured for sending one or more images that are associated with a particular event to responder that is physically responding to the event.

27. An apparatus for managing calls, comprising:
means for receiving a plurality of calls related to a plurality of events, wherein at least a portion of the calls are queued to await handling by an agent;
means for collecting a plurality of images or videos from one or more of the queued calls;
means for prioritizing the queued calls for handling by an agent based on a plurality of different event types determined from the collected images and/or videos; and
means for selecting a call for handling by an agent based on the image/video based priority.

\* \* \* \* \*